US009119175B2

(12) United States Patent
Kuo (10) Patent No.: US 9,119,175 B2
(45) Date of Patent: Aug. 25, 2015

(54) METHOD AND APPARATUS FOR HANDLING MBMS DYNAMIC SCHEDULING INFORMATION

(75) Inventor: Richard Lee-Chee Kuo, Taipei (TW)

(73) Assignee: INNOVATIVE SONIC CORPORATION, Taipei (TW)

( * ) Notice: Subject to any disclaimer, the term of this patent is extended or adjusted under 35 U.S.C. 154(b) by 995 days.

(21) Appl. No.: 12/796,657

(22) Filed: Jun. 8, 2010

(65) Prior Publication Data
US 2010/0309835 A1  Dec. 9, 2010

Related U.S. Application Data

(60) Provisional application No. 61/184,847, filed on Jun. 8, 2009.

(51) Int. Cl.
*H04H 20/71* (2008.01)
*H04L 12/28* (2006.01)
*H04W 72/00* (2009.01)
*H04W 4/06* (2009.01)
*H04W 72/12* (2009.01)

(52) U.S. Cl.
CPC ............. *H04W 72/005* (2013.01); *H04W 4/06* (2013.01); *H04W 72/1289* (2013.01)

(58) Field of Classification Search
CPC ..................................................... H04W 4/06
USPC .................... 370/312, 315, 389, 395.1, 395.4
See application file for complete search history.

(56) References Cited

U.S. PATENT DOCUMENTS

| 2005/0188054 A1* | 8/2005 | Riihijarvi et al. ............. 709/218 |
| 2005/0190712 A1* | 9/2005 | Lee et al. ...................... 370/312 |
| 2009/0092056 A1* | 4/2009 | Kitazoe ......................... 370/252 |
| 2011/0075621 A1* | 3/2011 | Sung et al. .................... 370/329 |

FOREIGN PATENT DOCUMENTS

| EP | 1 585 351 A1 | 10/2005 |
| KR | 1020080099301 | 11/2008 |
| WO | 2005079105 A1 | 8/2005 |

OTHER PUBLICATIONS

Alcatel-Lucent, MAC PDU design for eMBMS scheduling May 4-8, 2009, 3GPP TSG-RAN WG2 #66, R2-093093, 1-3.*
Notice of Allowance on corresponding foreign Patent Application (KR 10-2010-0054109) issued on Feb. 29, 2012.
3GPP Change Request R2-093533, "MBMS baseline for Rel-9", May 2009.

(Continued)

*Primary Examiner* — Samina Choudhry
(74) *Attorney, Agent, or Firm* — Blue Capital Law Firm, P.C.

(57) ABSTRACT

A method for handling MBMS dynamic scheduling information in a network terminal of a wireless communication system is disclosed. The method includes steps of generating a MAC Control Element for carrying an MBMS dynamic scheduling information, the MAC Control Element containing at least one fields, each corresponding to one MBMS service transmitted on an MCH, for indicating an ending point of sub-frames used by the corresponding MBMS services in a scheduling period of the MCH; and setting a first field to a specific value to indicate there is no sub-frame scheduled for the corresponding MBMS service in the scheduling period when the corresponding MBMS service has no data for transmission in the scheduling period.

30 Claims, 6 Drawing Sheets

(56) References Cited

OTHER PUBLICATIONS

3GPP R2-093093, "MAC PDU design for eMBMS scheduling", May 2009.
3GPP TS 25.331 v7.8.0, "RRC Protocol Specification (Release 7)", Mar. 2008.
3GPP R2-092971, "Finding MCCH/MTCH", May 2009.
Alcatel-Lucent Shanghai Bell, Alcatel-Lucent: "Service multiplexing and signalling for eMBMS", 3GPP TSG-RAN WG3 #64, R3-091301, May 4-8, 2009, pp. 1-5, XP050341653, San Francisco, US.
Huawei: "MBMS Dynamic Scheduling", 3GPP TSG-RAN WG2 Meeting #66, R2-092962, May 4-8, 2009, XP050340756, San Francisco, USA.
Alcatel-Lucent: "E-MBMS Service multiplexing, Scheduling and data handling", 3GPP TSG RAN WG2 #60, R2-075048, Nov. 5-6, 2007, pp. 1-6, XP050137525, Jeju, Korea.

* cited by examiner

METHOD AND APPARATUS FOR HANDLING MBMS DYNAMIC SCHEDULING INFORMATION

CROSS REFERENCE TO RELATED APPLICATIONS

This application claims the benefit of U.S. Provisional Application No. 61/184,847, filed on Jun. 8, 2009 and entitled "Method and apparatus for MBMS dynamic scheduling information design in a wireless communication system", the contents of which are incorporated herein by reference.

BACKGROUND OF THE INVENTION

1. Field of the Invention

The present invention relates to a method and apparatus for handling MBMS dynamic scheduling information, and more particularly, to a method and apparatus for handling MBMS dynamic scheduling information in a network terminal of a wireless communication system, so as to enhance MBMS scheduling efficiency.

2. Description of the Prior Art

To enhance multimedia performance of the 3G mobile telecommunications system, the 3rd Generation Partnership Project (3GPP) introduces a Multimedia Broadcast Multicast Service (MBMS), which is a point-to-multipoint bearer service established on an existing network architecture of the Universal Mobile Telecommunications System (UMTS). MBMS allows a single source terminal to simultaneously transmit data to multiple user equipments (UEs) via Internet Protocol (IP) packets.

However, as the multimedia performance of mobile devices advances, consumers are more interested to have multimedia or mobile TV services via the mobile devices. In order to meet such requirement, the 3GPP introduces an enhanced MBMS (eMBMS) in a specification of long term evolution (LTE) Release-9, to support high quality streaming multimedia and real-time MBMS services.

For improving performance of MBMS service, eMBMS introduces a single frequency network (SFN) operation for MBMS transmission, i.e. MBMS Single Frequency Network (MBSFN), to reduce service interruption due to frequency switching during transmissions.

In addition, eMBMS only defines two logical channels to support point-to-multipoint (p-t-m) downlink transmission: Multicast Control Channel (MCCH) and Multicast Traffic Channel (MTCH). MCCH is utilized for transmitting control messages of all MBMS services in an MBSFN, and MTCH is utilized for transmitting session data of an MBMS service. Both MCCH and MTCH are mapped to a transmission channel newly defined by eMBMS, i.e. Multicast Channel (MCH).

In general, an MBSFN has an MCCH. However, when an enhanced Node B (eNB) is simultaneously covered by multiple MBSFN areas, the eNB may have multiple MCCHs. Besides, since an MBSFN area can simultaneously support multiple MBMS services, and different MBMS services may have different requirements, such as Quality of Service (QoS), Block Error Rate (BLER), according to different characteristics, an MBSFN area may have multiple MCHs. Different MCHs suffice requirements of different MBMS services by applying different modulation and encoding schemes. MCCH is mainly responsible for providing these MCHs with the following control parameters:

(1) Modulation and Coding Scheme (MCS): illustrating encoding and modulation scheme of each MCH.

(2) MBMS service list: listing MBMS services currently provided by each MCH, and including MBMS service ID and session ID, and further including corresponding Logical channel ID (LCID) of MBMS services. Noticeably, MBMS service list only provides session information of MBMS services currently processed. In other words, once a session of one of the MBMS services is ended, a network terminal removes session information of the MBMS service from the MBMS service list, to notify a UE related to the MBMS service that the MBMS service session has been ended.

(3) MCH Sub-frame Allocation Pattern (MSAP): defining a pattern of sub-frames used by each MCH in a scheduling period. A set of these sub-frames used by one MCH is called an MSAP occasion. In each MSAP occasion, a network terminal can apply multiplexing of MTCHs and MCCH corresponding to different MBMS services to be transmitted on the MCH. A transmission order of MTCHs can be determined according to an order of the MBMS service list.

Since an MCH may simultaneously provide multiple MBMS services, while an MBMS UE may be only interested in one of the services, the current specification further provides a Dynamic Scheduling Information (DSI) for an MCH, to indicate the sub-frames used by each MTCH in an MSAP occasion. The following principles are used for the Dynamic scheduling information:

(1) The dynamic scheduling information is used without considering whether multiple services are multiplexed onto an MCH to transmit or not.

(2) The dynamic scheduling information is generated by the eNB, and is transmitted at the beginning of each MSAP occasion, i.e. a first sub-frame.

(3) The dynamic scheduling information allows a UE to determine which sub-frames are used by each MTCH.

(4) How a dynamic scheduling information is carried is for further study, e.g. the dynamic scheduling information can be carried in a MAC Control Element or transmitted via a separate logical channel, such as a Multicast Scheduling Channel (MSCH).

(5) A mapping relation between an MTCH and corresponding sub-frames is determined according to indexes of sub-frames belonging to each MSAP occasion.

For the current specification, 3GPP change request R2-093093 proposes to use an MBMS scheduling info MAC control element for carrying the dynamic scheduling information. In an MBMS scheduling info MAC control element, each MBMS service contains one ending point index (EPI) field for each MBMS service, for indicating an index of an ending sub-frame for each MBMS service in the current scheduling period.

Figure 6:
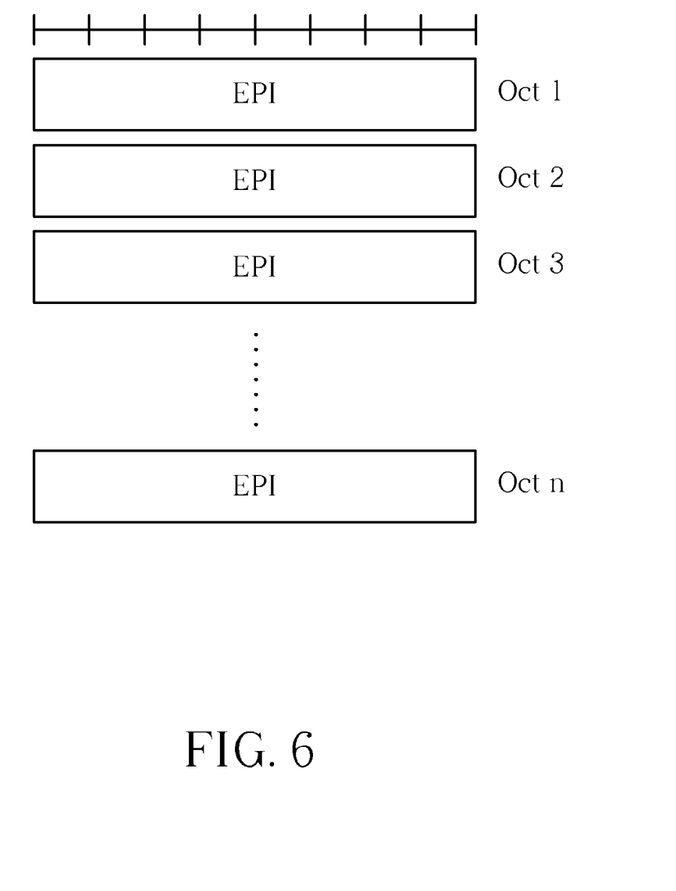
FIG. 6 is a schematic diagram of an MBMS scheduling info MAC control element.

Please refer to FIG. 6, which is a schematic diagram of an MBMS scheduling info MAC control element. As shown in FIG. 6, a size of each EPI fields is 8 bits. An amount of the EPI fields is equal to that of services provided in the MBSFN area. A mapping relation between the EPI fields and the provided services is one-to-one, and an order of the EPI fields is the same with an order of appearance of the services in the MBMS service list. Therefore, a UE can refer to the order of appearance of these services in the MBMS service list, to derive each EPI representing an index of an ending sub-frame of which MBMS service. Noticeably, it is assumed that each MBMS service uses continuous sub-frames in a scheduling period when MBMS scheduling info MAC control element is defined.

As can be seen from the above, when a particular MBMS service session is ended, the network terminal removes information of the MBMS service from the MBMS service list. However, the MBMS service list is transmitted on an MCCH, and data is transmitted on an MCCH periodically, whereby data repeatedly transmitted within one period is unchanged. Therefore, the network terminal can only update data in a next period. Before the UE receives a new MBMS service list, the UE still refers to the original service list to receive MBMS service on the MCH. Under such a situation, not all MBMS services have data for transmission in the scheduling period. Therefore, how to indicate those MBMS sessions not transmitted in the scheduling period, such that a mapped relation between the EPI fields and services provided on the MCH is correct, is a problem the present invention intends to solve.

SUMMARY OF THE INVENTION

It is therefore an objective of the present invention to provide a method and apparatus for handling MBMS dynamic scheduling information.

The present invention discloses a method for handling MBMS dynamic scheduling information in a network terminal of a wireless communication system. The method includes steps of generating a MAC Control Element for carrying an MBMS dynamic scheduling information, the MAC Control Element containing at least one fields, each corresponding to one MBMS service transmitted on an Multicast Channel (MCH), for indicating an ending point of sub-frames used by the corresponding MBMS service in a scheduling period of the MCH, and setting one of the at least one fields to a specific value to indicate there is no sub-frame scheduled for the corresponding MBMS service in the scheduling period when the corresponding MBMS service has no data for transmission.

The present invention further discloses a communication device for handling MBMS dynamic scheduling information in a network terminal of a wireless communication system. The communication device includes a processor, for executing a program, and a memory, coupled to the processor, for storing the program. The program includes steps of generating a MAC Control Element for carrying an MBMS dynamic scheduling information, the MAC Control Element containing at least one fields, each corresponding to one MBMS service transmitted on an Multicast Channel (MCH), for indicating an ending point of sub-frames used by the corresponding MBMS service in a scheduling period of the MCH, and setting one of the at least one fields to a specific value to indicate there is no sub-frame scheduled for the corresponding MBMS service in the scheduling period when the corresponding MBMS service has no data for transmission.

The present invention discloses a method for handling MBMS dynamic scheduling information in a user equipment (UE) of a wireless communication system. The method includes steps of receiving a MAC Control Element for carrying an MBMS dynamic scheduling information, the MAC Control Element containing at least one fields, each corresponding to one MBMS service transmitted on an Multicast Channel (MCH), for indicating an ending point of sub-frames used by the corresponding MBMS service in a scheduling period of the MCH, selectively receiving at least one MBMS services on the MCH in the scheduling period according to values of the at least one fields, and determining there is no sub-frame scheduled for a corresponding MBMS service in the scheduling period when one of the at least one fields is set to a specific value, for deriving the starting point of sub-frames used by the next MBMS service.

The present invention further discloses a communication device for handling MBMS dynamic scheduling information in a user equipment (UE) of a wireless communication system. The communication device includes a processor, for executing a program, and a memory, coupled to the processor, for storing the program. The program includes steps of receiving a MAC Control Element for carrying an MBMS dynamic scheduling information, the MAC Control Element containing at least one fields, each corresponding to one MBMS service transmitted on an Multicast Channel (MCH), for indicating an ending point of sub-frames used by the corresponding MBMS service in a scheduling period of the MCH, selectively receiving at least one MBMS services on the MCH in the scheduling period according to values of the at least one fields, and determining there is no sub-frame scheduled for a corresponding MBMS service in the scheduling period when one of the at least one fields is set to a specific value, for deriving the starting point of sub-frames used by the next MBMS service.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
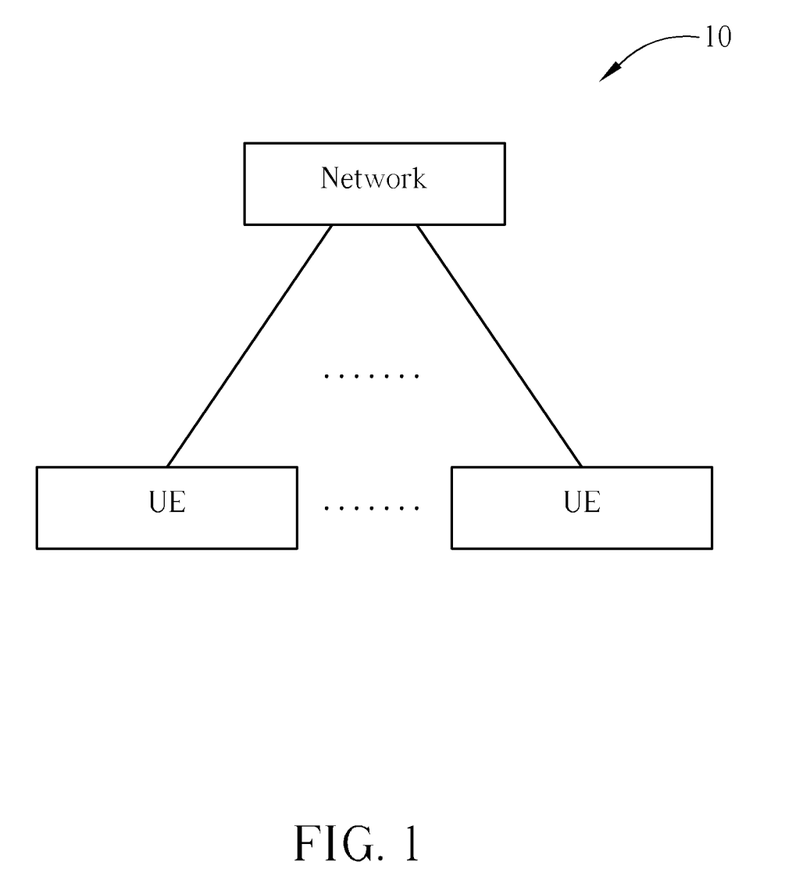
FIG. 1 is a schematic diagram of a wireless communications system.

Please refer to FIG. 1, which illustrates a schematic diagram of a wireless communications system 10. The wireless communications system 10 is preferred to be an LTE-advanced (LTE-A) system, and is briefly composed of a network and a plurality of user equipments (UEs). In FIG. 1, the network and the UEs are simply utilized for illustrating the structure of the wireless communications system 10. Practically, the network may comprise a plurality of base stations (Node Bs), radio network controllers and so on according to actual demands, and the UEs can be devices such as mobile phones, computer systems, etc.

Figure 2:
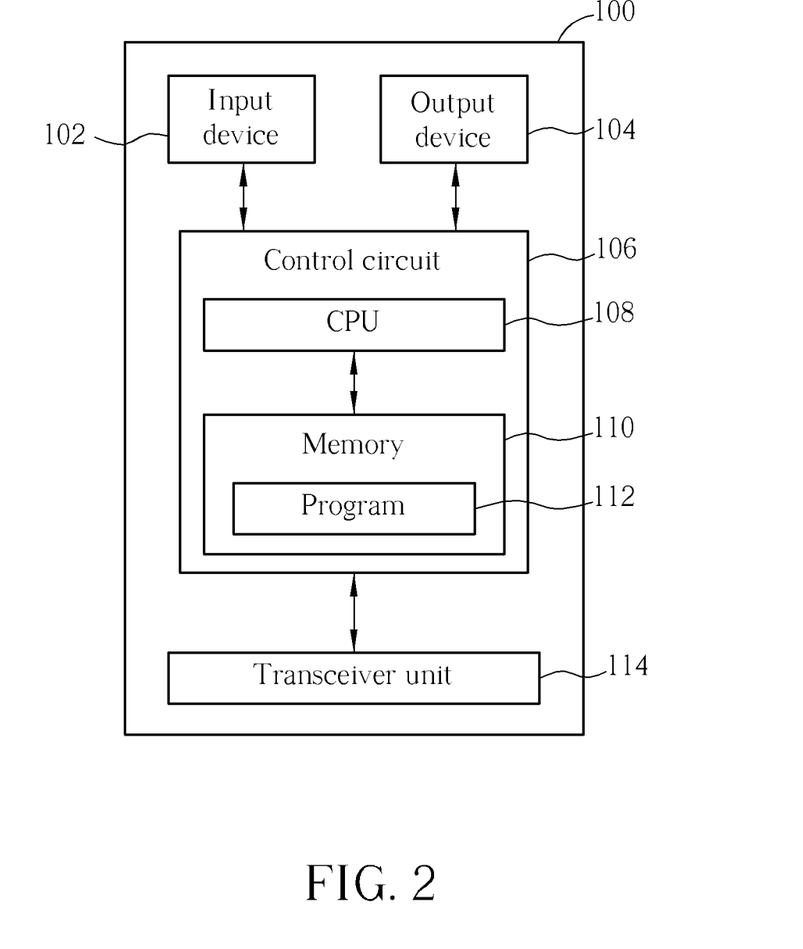
FIG. 2 is a function block diagram of a wireless communications device.

Please refer to FIG. 2, which is a functional block diagram of a communications device 100 in a wireless communications system. The communications device 100 can be utilized for realizing the UEs or the network in FIG. 1. For the sake of brevity, FIG. 2 only shows an input device 102, an output device 104, a control circuit 106, a central processing unit (CPU) 108, a memory 110, a program 112, and a transceiver unit 114 of the communications device 100. In the communications device 100, the control circuit 106 executes the program code 112 in the memory 110 through the CPU 108, thereby controlling an operation of the communications device 100. The communications device 100 can receive signals input by a user through the input device 102, such as a keyboard, and can output images and sounds through the output device 104, such as a monitor or speakers. The transceiver unit 114 is used to receive and transmit wireless signals, delivering received signals to the control circuit 106, and outputting signals generated by the control circuit 106 wirelessly. From a perspective of a communications protocol framework, the transceiver unit 114 can be seen as a portion of Layer 1, and the control circuit 106 can be utilized to realize functions of Layer 2 and Layer 3.

Figure 3:
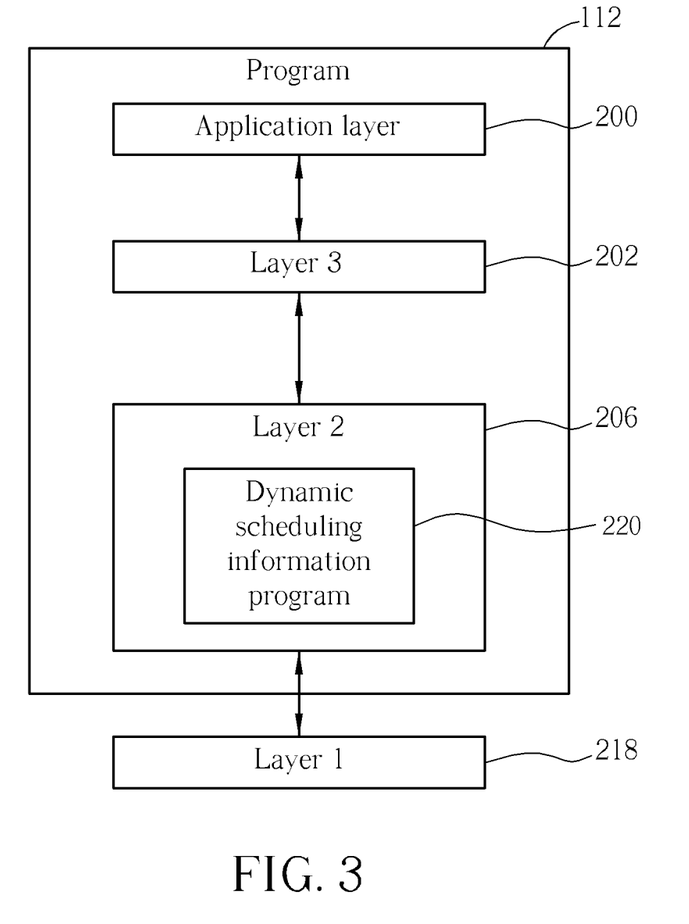
FIG. 3 is a schematic diagram of a program code of FIG. 2.

Please continue to refer to FIG. 3. FIG. 3 is a diagram of the program 112 shown in FIG. 2. The program 112 includes an application layer 200, a Layer 3 202, and a Layer 2 206, and is coupled to a Layer 1 218. The Layer 3 202 performs radio resource control. The Layer 2 206 comprises a Radio Link Control (RLC) layer and a Medium Access Control (MAC) layer, and performs link control. The Layer 1 218 performs physical connections.

The wireless communication device 100 can provide an enhanced MBMS (eMBMS), to support high quality streaming multimedia and real-time MBMS services. The eMBMS defines two logical channels to support point-to-multipoint (p-t-m) downlink transmission: Multicast Control Channel (MCCH) and Multicast Traffic Channel (MTCH). MCCH is utilized for transmitting control messages of all MBMS services in an MBMS Single Frequency Network (MBSFN), and MTCH is utilized for transmitting session data of an MBMS service. Both MCCH and MTCH are mapped to a transmission channel newly defined by eMBMS, i.e. Multicast Channel (MCH).

Since an MCH may simultaneously provide multiple MBMS services, while an MBMS UE may be only interested in one of the services, the current specification further provides a Dynamic Scheduling Information (DSI) for an MCH, to indicate the sub-frames used by each MTCH in an MSAP occasion. Under such a situation, the present invention provides a dynamic scheduling information program 220 in the program 112, for handling MBMS dynamic scheduling information in an MBSFN, to enhance MBMS scheduling efficiency.

Figure 4:
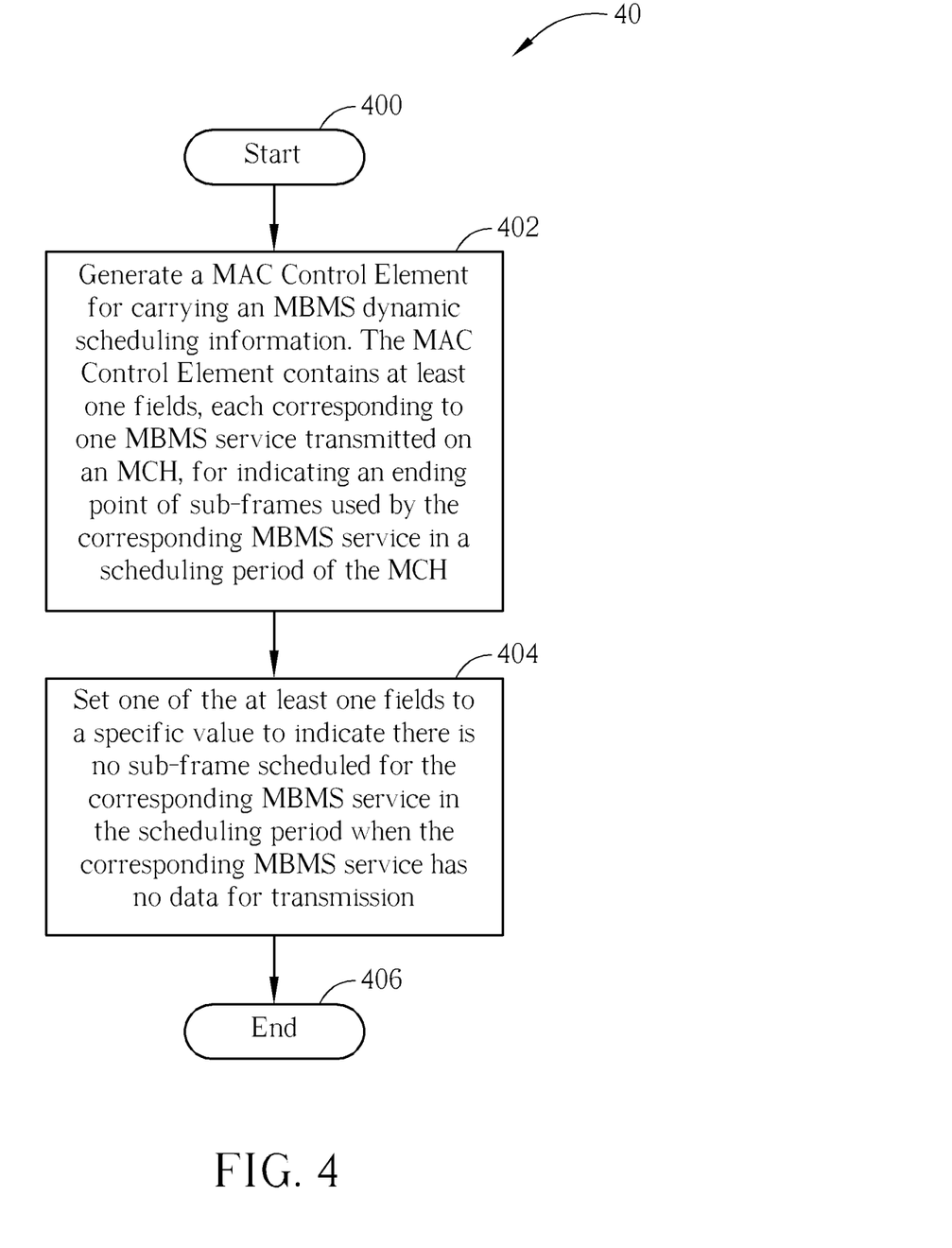
FIG. 4 is a schematic diagram of a process according to an embodiment of the present invention.

Please refer to FIG. 4, which is a schematic diagram of a process 40 according to an embodiment of the present invention. The process 40 is utilized for handling MBMS dynamic scheduling information in a network terminal of a wireless communication system, and can be compiled into the dynamic scheduling information program 220. The process 40 includes the following steps:

Step 400: Start.

Step 402: Generate a MAC Control Element for carrying an MBMS dynamic scheduling information. The MAC Control Element contains at least one fields, each corresponding to one MBMS service transmitted on an MCH, for indicating an ending point of sub-frames used by the corresponding MBMS service in a scheduling period of the MCH.

Step 404: Set one of the at least one fields to a specific value to indicate there is no sub-frame scheduled for the corresponding MBMS service in the scheduling period when the corresponding MBMS service has no data for transmission.

Step 406: End.

According to the process 40, the network terminal first generates a MAC Control Element for carrying an MBMS dynamic scheduling information, i.e. MBMS scheduling info MAC control element. The MAC Control Element is transmitted in the first sub-frame used by an MCH corresponding to the dynamic scheduling information in a scheduling period. An MBMS scheduling info MAC control element contains at least one field, i.e. an Ending Point Index (EPI) field, and each field is corresponding to one MBMS service transmitted on the MCH, for indicating an ending point of sub-frames used by the MBMS service in the scheduling period. Scheduling periods with different lengths can be used on different MCHs, for respectively generating the dynamic scheduling information. Noticeably, sub-frames occupied by an MCH in a scheduling period are allocated by the network terminal via an MCCH.

When an MBMS service has no data for transmission in a scheduling period, e.g. when the MBMS service session is ended, the network terminal sets a corresponding field to a specific value, e.g. a maximum value that all bits of an EPI field can represent, to indicate there is no sub-frame scheduled for the corresponding MBMS service in the scheduling period. Taking 8 bits for example, the maximum value is "11111111". In other words, when not all MBMS services have data for transmission in the scheduling period, e.g. when one MBMS service session is ended, the network terminal sets a corresponding EPI field to a specific value, to indicate the corresponding MBMS service is not transmitted in the scheduling period.

Therefore, a UE can know the index of the last sub-frame of sub-frames used by each MBMS service in the current scheduling period according to values of each EPI field in the MBMS scheduling info MAC control element. Meanwhile, since the last sub-frame used by an MBMS service is the first sub-frame used by the next service, if the MBMS service has no data for transmission in the current scheduling period, the UE of the embodiment of the present invention can refer to the last sub-frame used by the previous MBMS service, so as to correctively receive MBMS services on the MCH.

In general, an MBMS scheduling info MAC control element is generated when each scheduling period starts. As can be seen from the prior art, a scheduling period is a duration of an MSAP occasion, which can be a fixed duration, such as 320 ms, and can be adjusted dynamically according to data volume as well. An MSAP occasion is a set of sub-frames defined by an MCH Sub-frame Allocation Pattern (MSAP). As for description of the MSAP occasion and the MSAP, please refer to the description in the prior art, which are not narrated hereinafter.

Noticeably, an MBMS scheduling info MAC control element is used under the assumption that all MBMS services use continuous sub-frames in a scheduling period.

Figure 5:
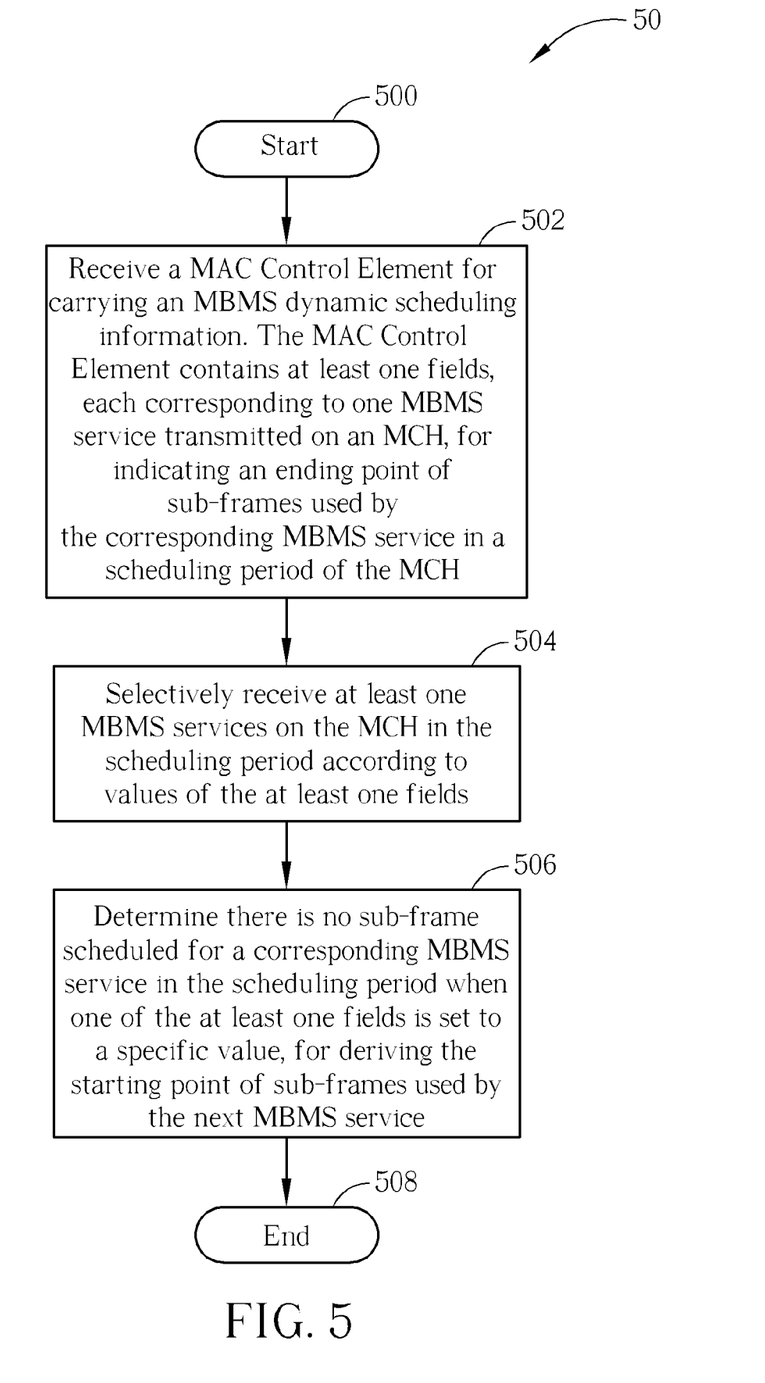
FIG. 5 is a schematic diagram of a process according to another embodiment of the present invention.

Furthermore, the embodiment of the present invention also provides related operations for handling MBMS dynamic scheduling information in a UE, to coordinate a UE and a network terminal. Please refer to FIG. 5, which is a schematic diagram of a process 50 according to an embodiment of the present invention. The process 50 is utilized for handling MBMS dynamic scheduling information in a UE of a wireless communication system, and can be compiled into the dynamic scheduling information program 220 as well. The process 50 includes the following steps:

Step 500: Start.

Step 502: Receive a MAC Control Element for carrying an MBMS dynamic scheduling information. The MAC Control Element contains at least one fields, each corresponding to one MBMS service transmitted on an Multicast Channel (MCH), for indicating an ending point of sub-frames used by the corresponding MBMS service in a scheduling period of the MCH.

Step 504: Selectively receive at least one MBMS services on the MCH in the scheduling period according to values of the at least one fields.

Step 506: Determine there is no sub-frame scheduled for a corresponding MBMS service in the scheduling period when one of the at least one fields is set to a specific value, for deriving the starting point of sub-frames used by the next MBMS service.

Step 508: End.

According to the process 50, a UE receives a MAC Control Element for carrying an MBMS dynamic scheduling information, i.e. MBMS scheduling info MAC control element. The MAC Control Element is received in the first sub-frame used by an MCH corresponding to the dynamic scheduling information in a scheduling period. An MBMS scheduling info MAC control element contains at least one fields, i.e. an EPI field, and each field is corresponding to one MBMS service transmitted on the MCH, for indicating an ending point of sub-frames used by the MBMS service in the scheduling period. Noticeably, sub-frames occupied by an MCH in a scheduling period are allocated by a network terminal via an MCCH. Therefore, the UE has to receive an allocation message first, so as to start receiving an MBMS service on the MCH.

Then, the UE can selectively receive the MBMS services on the MCH in the current scheduling period according to values of each field. When one field of the MBMS scheduling info MAC control element is set to a specific value, e.g. a maximum value that all bits of an EPI field can represent, the UE determines there is no sub-frame scheduled for the MBMS service corresponding to the field in the current scheduling period. Taking 8 bits for example, the maximum value is "11111111".

Therefore, the UE can know the index of the last sub-frame of sub-frames used by each MBMS service in the current scheduling period according to values of each EPI field of the MBMS scheduling info MAC control element. Meanwhile, since the last sub-frame used by an MBMS service is the first sub-frame used by the next service, if the MBMS service has no data for transmission in the current scheduling period, the UE of the embodiment of the present invention can refer to the last sub-frame used by the previous MBMS service, so as to correctively receive MBMS services on the MCH.

To sum up, in the present invention, if not all MBMS services have data for transmission in a scheduling period, e.g. when an MBMS service session is ended, a network terminal sets the corresponding EPI field to a specific value, to indicate the corresponding MBMS service is not transmitted in the scheduling period. Under such a situation, there is a correct mapped relation between EPI fields and MBMS services transmitted on an MCH.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method for handling Multimedia Broadcast Multicast Service (MBMS) dynamic scheduling information in a network terminal of a wireless communication system, the method comprising:
   generating a Medium Access Control (MAC) Control Element for carrying an MBMS dynamic scheduling information, the MAC Control Element containing EPI (Ending Point Index) fields,
   wherein each EPI field corresponds to one MBMS service transmitted on an Multicast Channel (MCH), and each EPI field is set to an index indicating an ending sub-frame used by the corresponding MBMS service in a current scheduling period of the MCH; and
   setting one of the EPI fields to a maximum value that all bits of the EPI field could represent to indicate that there is no sub-frame scheduled for the corresponding MBMS service in the current scheduling period if the corresponding MBMS service has no data for transmission in the current scheduling period.

2. The method of claim 1, wherein sub-frames occupied by the MCH in the scheduling period are allocated by the network terminal via a Multicast Control Channel.

3. The method of claim 1, wherein each MBMS service uses continuous sub-frames in the scheduling period.

4. The method of claim 1, wherein indicating the ending point of the sub-frames used by the corresponding MBMS service in the scheduling period of the MCH is indicating an index of the last sub-frame of the sub-frames used by the MBMS service in the scheduling period.

5. The method of claim 1, wherein the scheduling period is a duration for the network terminal to generate a MAC Control Element, and different MCHs have different durations.

6. The method of claim 5 further comprising the network terminal multiplexing all MBMS services transmitted in the scheduling period and transmitting the MBMS services on the MCH according to the timing defined in the corresponding dynamic scheduling information for each MBMS service.

7. The method of claim 1, wherein all bits of the EPI field are set to 1's to represent the maximum value.

8. The method of claim 1, wherein the MAC Control Element is transmitted in the first sub-frame in the scheduling period.

9. A communication device for handling Multimedia Broadcast Multicast Service (MBMS) dynamic scheduling information in a network terminal of a wireless communication system, the communication device comprising:
   a processor, for executing a program; and
   a memory, coupled to the processor, for storing the program, wherein the program comprises:
      generating a Medium Access Control (MAC) Control Element for carrying an MBMS dynamic scheduling information, the MAC Control Element containing EPI (Ending Point Index) fields,
      wherein each EPI field corresponds to one MBMS service transmitted on an Multicast Channel (MCH), and each EPI field is set to an index indicating an ending sub-frame used by the corresponding MBMS service in a current scheduling period of the MCH; and
      setting one of the EPI fields to a maximum value that all bits of the EPI field could represent to indicate that there is no sub-frame scheduled for the corresponding MBMS service in the current scheduling period if the corresponding MBMS service has no data for transmission in the current scheduling period.

10. The communication device of claim 9, wherein sub-frames occupied by the MCH in the scheduling period are allocated by the network terminal via a Multicast Control Channel.

11. The communication device of claim 9, wherein each MBMS service uses continuous sub-frames in the scheduling period.

12. The communication device of claim 9, wherein indicating the ending point of the sub-frames used by the corresponding MBMS service in the scheduling period of the MCH is indicating an index of the last sub-frame of the sub-frames used by the MBMS service in the scheduling period.

13. The communication device of claim 9, wherein the scheduling period is a duration for the network terminal to generate a MAC Control Element, and different MCHs have different durations.

14. The communication device of claim 13, wherein the program further comprises the network terminal multiplexing all MBMS services transmitted in the scheduling period and transmitting the MBMS services on the MCH according to the timing defined in the corresponding dynamic scheduling information for each MBMS service.

15. The communication device of claim 9, wherein all bits of the EPI field are set to 1's to represent the maximum value.

16. The communication device of claim 9, the MAC Control Element is transmitted in the first sub-frame in the scheduling period.

17. A method for handling Multimedia Broadcast Multicast Service (MBMS) dynamic scheduling information in a user equipment (UE) of a wireless communication system, the method comprising:

receiving a Medium Access Control (MAC) Control Element for carrying an MBMS dynamic scheduling information, the MAC Control Element containing EPI (Ending Point Index) fields, wherein each EPI field corresponds to one MBMS service transmitted on a Multicast Channel (MCH), and each EPI field is set to an index indicating an ending sub-frame used by the corresponding MBMS service in a current scheduling period of the MCH;

selectively receiving at least one MBMS services on the MCH in the current scheduling period according to values of the EPI fields; and determining that there is no sub-frame transmission scheduled for a corresponding MBMS service in the current scheduling period if one of the EPI fields is set to a maximum value that all bits of the EPI field could represent.

18. The method of claim 17, wherein sub-frames occupied by the MCH in the scheduling period are allocated by a network terminal of the wireless communication system via an Multicast Control Channel.

19. The method of claim 17, wherein each MBMS service uses continuous sub-frames in the scheduling period.

20. The method of claim 17, wherein indicating the ending point of the sub-frames used by the corresponding MBMS service in the scheduling period of the MCH is indicating an index of the last sub-frame of sub-frames used by the MBMS service in the scheduling period.

21. The method of claim 17, wherein the scheduling period is a duration for a network terminal of the wireless communication system to generate a MAC Control Element, and different MCHs have different durations.

22. The method of claim 17, wherein all bits of the EPI field are set to 1's to represent the maximum value.

23. The method of claim 17, wherein the UE receives the MAC Control Element in the first sub-frame in the scheduling period.

24. A communication device for handling Multimedia Broadcast Multicast Service (MBMS) dynamic scheduling information in a user equipment (UE) of a wireless communication system, the communication device comprising:

a processor, for executing a program; and a memory, coupled to the processor, for storing the program, wherein the program comprises:

receiving a Medium Access Control (MAC) Control Element for carrying an MBMS dynamic scheduling information, the MAC Control Element containing EPI (Ending Point Index) fields, wherein each EPI field corresponds to one MBMS service transmitted on a Multicast Channel (MCH), and each EPI field is set to an index indicating an ending sub-frame used by the corresponding MBMS service in a current scheduling period of the MCH;

selectively receiving at least one MBMS services on the MCH in the current scheduling period according to values of the EPI fields; and determining that there is no sub-frame transmission scheduled for a corresponding MBMS service in the current scheduling period if one of the EPI fields is set to a maximum value that all bits of the EPI field could represent.

25. The communication device of claim 24, wherein sub-frames occupied by the MCH in the scheduling period are allocated by a network terminal of the wireless communication system via an Multicast Control Channel.

26. The communication device of claim 24, wherein each MBMS service uses continuous sub-frames in the scheduling period.

27. The communication device of claim 24, wherein indicating the ending point of the sub-frames used by the corresponding MBMS service in the scheduling period of the MCH is indicating an index of the last sub-frames of sub-frames used by the MBMS service in the scheduling period.

28. The communication device of claim 24, wherein the scheduling period is a duration for a network terminal of the wireless communication system to generate a MAC Control Element, and different MCHs have different durations.

29. The communication device of claim 24, wherein all bits of the EPI field are set to 1's to represent the maximum value.

30. The communication device of claim 24, wherein the UE receives the MAC Control Element in the first sub-frame in the scheduling period.

\* \* \* \* \*